(12) United States Patent
Lee et al.

(10) Patent No.: US 7,546,201 B2
(45) Date of Patent: Jun. 9, 2009

(54) METHOD FOR OBTAINING TRAFFIC INFORMATION USING BILLING INFORMATION OF MOBILE TERMINAL

(75) Inventors: Jae-young Lee, Anyang-shi (KR); Chi-ik Chung, Seoul (KR); Hee-sook Jang, Seoul (KR); Chung-hak Lee, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 432 days.

(21) Appl. No.: 10/563,936

(22) PCT Filed: Jun. 29, 2004

(86) PCT No.: PCT/KR2004/001586

§ 371 (c)(1),
(2), (4) Date: Sep. 28, 2006

(87) PCT Pub. No.: WO2005/006789

PCT Pub. Date: Jun. 20, 2005

(65) Prior Publication Data

US 2007/0162327 A1    Jul. 12, 2007

(30) Foreign Application Priority Data

Jul. 14, 2003    (KR) .................. 10-2003-0048004

(51) Int. Cl.
*G08G 1/00*    (2006.01)

(52) U.S. Cl. .................. 701/117; 701/119; 340/933; 340/995.27; 340/995.25

(58) Field of Classification Search .................. 701/117, 701/119, 200; 340/933, 988, 995.25, 995.27; 73/178 R See application file for complete search history.

(56) References Cited

U.S. PATENT DOCUMENTS

| | | | | |
|---|---|---|---|---|
| 4,774,671 | A | * | 9/1988 | Itoh et al. .................. 701/208 |
| 4,999,783 | A | * | 3/1991 | Tenmoku et al. ............ 701/217 |
| 5,109,344 | A | * | 4/1992 | Kakihara et al. ............ 701/209 |

(Continued)

FOREIGN PATENT DOCUMENTS

JP    2005306698 A  * 11/2005

OTHER PUBLICATIONS

R. L. French, "Map Matching Origins Approaches and Applications," Rober L. French & Associates, 3815 Lisbon St., Suite 201, Fort Worth, Tex., 76107, USA, pp. 91-116, No date, cited from other.*

(Continued)

*Primary Examiner*—Cuong H Nguyen
(74) *Attorney, Agent, or Firm*—Lowe Hauptman Ham & Berner, LLP

(57) ABSTRACT

The present invention relates to a method for obtaining traffic information using billing information of a mobile terminal. The method can prevent crosstalk between a vehicle on a highway and a vehicle on a local road parallel to the highway and obtain correct traffic information associated with the highway, when obtaining information indicative of a road traffic state in real time by obtaining a unique number of the mobile terminal from the billing information and tracking a moving time of a corresponding mobile terminal between base stations where the mobile terminal attempts a telephone call on the highway.

8 Claims, 5 Drawing Sheets

U.S. PATENT DOCUMENTS

| | | | |
|---|---|---|---|
| 5,270,937 A * | 12/1993 | Link et al. ................ 701/209 |
| 5,359,529 A * | 10/1994 | Snider ..................... 701/210 |
| 5,436,840 A * | 7/1995 | Lam et al. ................ 701/208 |
| 5,483,456 A * | 1/1996 | Kuwahara et al. ........... 701/215 |
| 5,610,821 A * | 3/1997 | Gazis et al. .............. 455/456.5 |
| 5,812,069 A * | 9/1998 | Albrecht et al. ............ 340/905 |
| 5,948,042 A * | 9/1999 | Heimann et al. ............ 701/208 |
| 5,995,023 A * | 11/1999 | Kreft .................... 340/995.25 |
| 6,154,152 A * | 11/2000 | Ito ........................ 340/988 |
| 6,381,533 B1 * | 4/2002 | Crane et al. ............... 701/200 |
| 6,405,128 B1 * | 6/2002 | Bechtolsheim et al. ....... 701/208 |
| 7,269,507 B2 * | 9/2007 | Cayford .................... 701/208 |
| 2008/0255754 A1 * | 10/2008 | Pinto ...................... 701/119 |

OTHER PUBLICATIONS

IEEE Trans. on Vehicular Tech. vol. VT-29 #2 5/80 pp. 216-225 "Function, Equipment, and Field Testing of a Route Guidance and Info . . . " P. Braegas, cited by others.*

Design of Transporter Signals and Recievers for Automatic Vehicle Location and Identification Systems; Donaldson, R.; Communications, IEEE Transactions on; vol. 23, Issue 5, May 1975 pp. 489-500.*

Next-Generation Automated Vehicle Location Systems: Positioning at the Lane Level; Jie Du; Barth, M.J.; Intelligent Transportation Systems, IEEE Transactions on; vol. 9, Issue 1, Mar. 2008 pp. 48-57; Digital Object Identifier 10.1109/TITS.2007.908141.*

They know where you are [location detection]; Warrior, J.; McHenry, E.; McGee, K,; Spectrum, IEEE; vol. 40, Issue 7, Jul. 2003 pp. 20-25; Digital Object Identifier 10.1109/MSPEC.2003.1209608.*

Drivers route selection: a philosophical consideration and user-interface; Pang, G.; Takahashi, K.; Yokota, T.; Takenaga, H.; Vehicle Navigation and Information Systems Conference, 1995. Proceedings. In conjunction with the Pacific Rim TransTech Conference. 6th International VNIS. 'A Ride into the Future';Jul. 30-Aug. 2, 1995 pp. 147-154.*

Dynamic origin-destination demand estimation using automation vehicle identification data; Xuesong Zhou; Mahmassani, H.S.; Intelligent Transportation Systems, IEEE Transactions on; vol. 7, Issue 7, Issue 1, Mar. 2006 pp. 105-114; Digital Object Identifier 10.1109/TITS.2006.869629.*

Comparison of potential paths selected by a malicious entity with hazardous materials : Minimization of time vs. minimization of distance; Nune, R.; Murray-Tuite, P.; Simulation Conference, 2007 Winter; Dec. 9-12, 2007 pp. 1161-1167; Digital Object Identifier 10.1109/WSC.2007.4419717.*

* cited by examiner

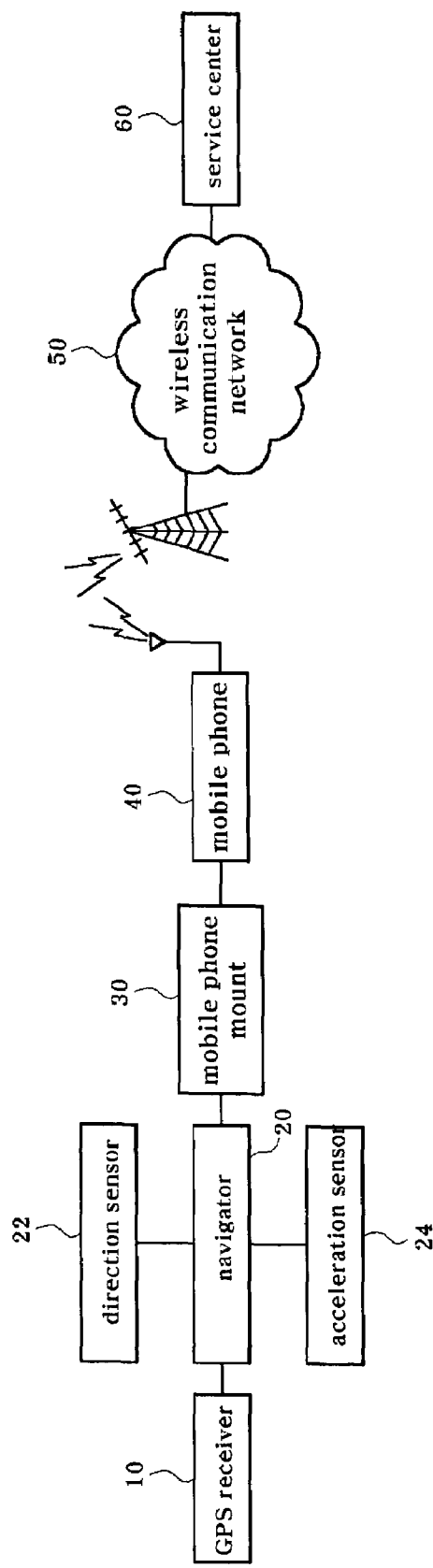
[Fig. 1]

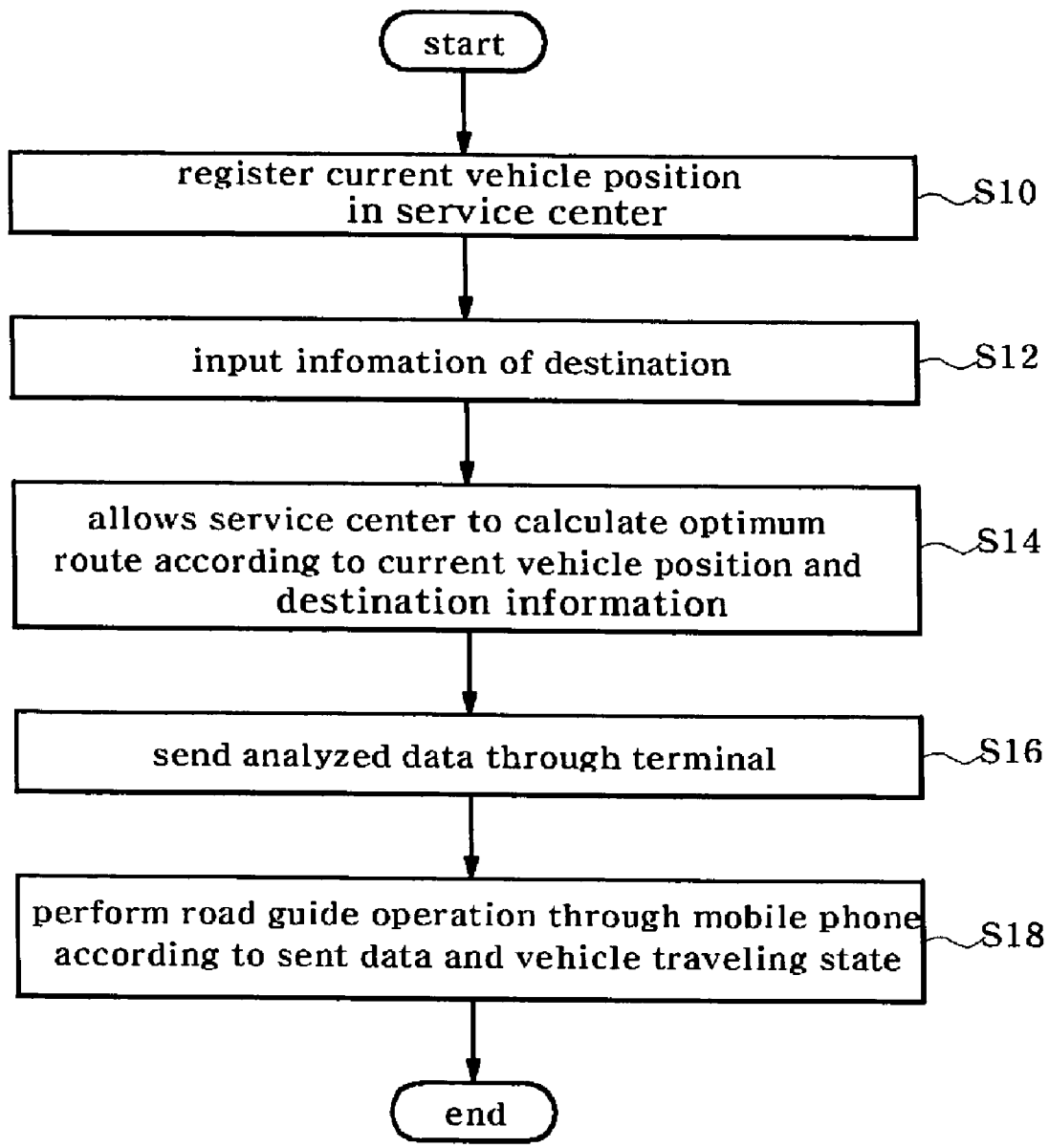

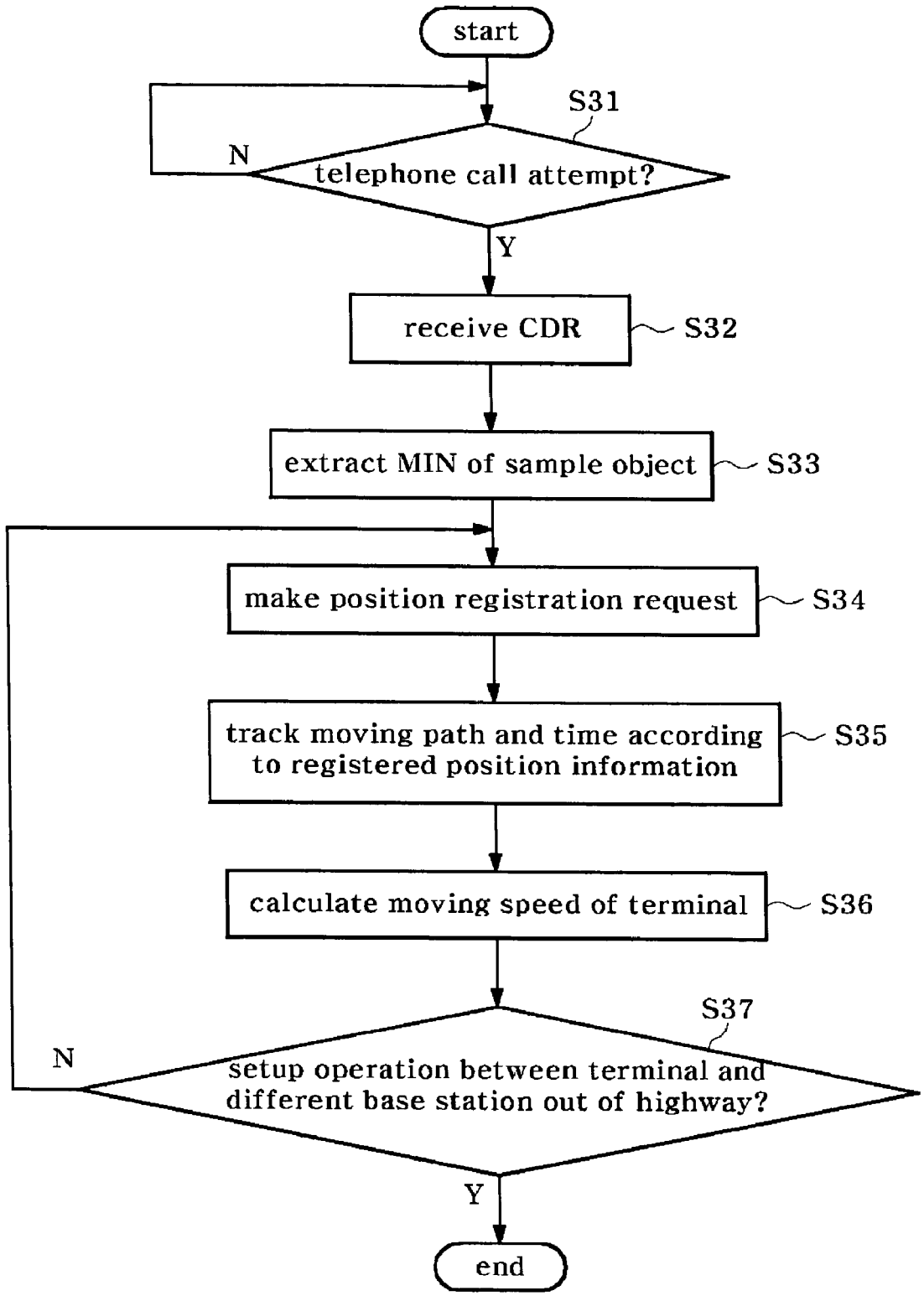
[Fig. 3]

[Fig. 4]
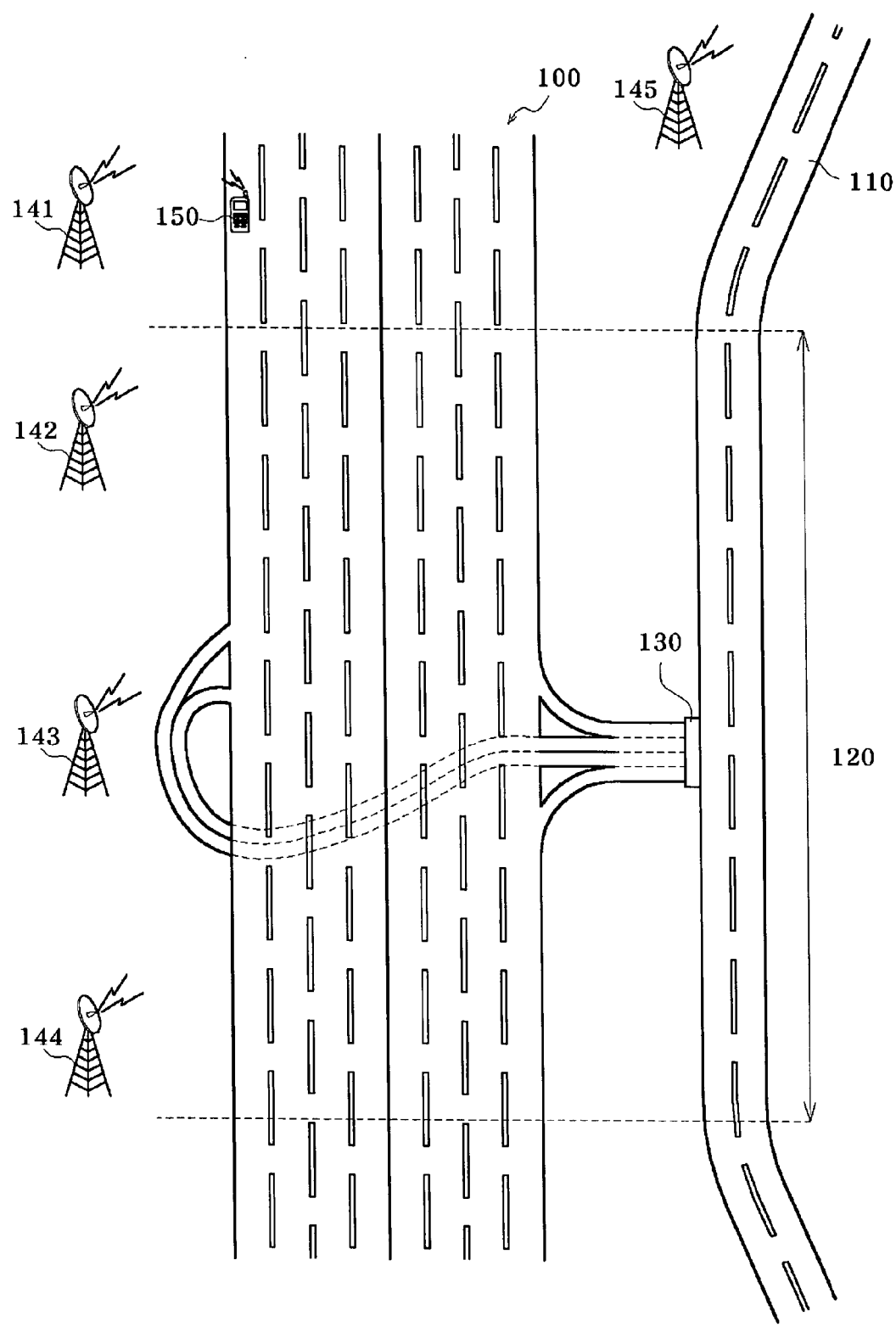

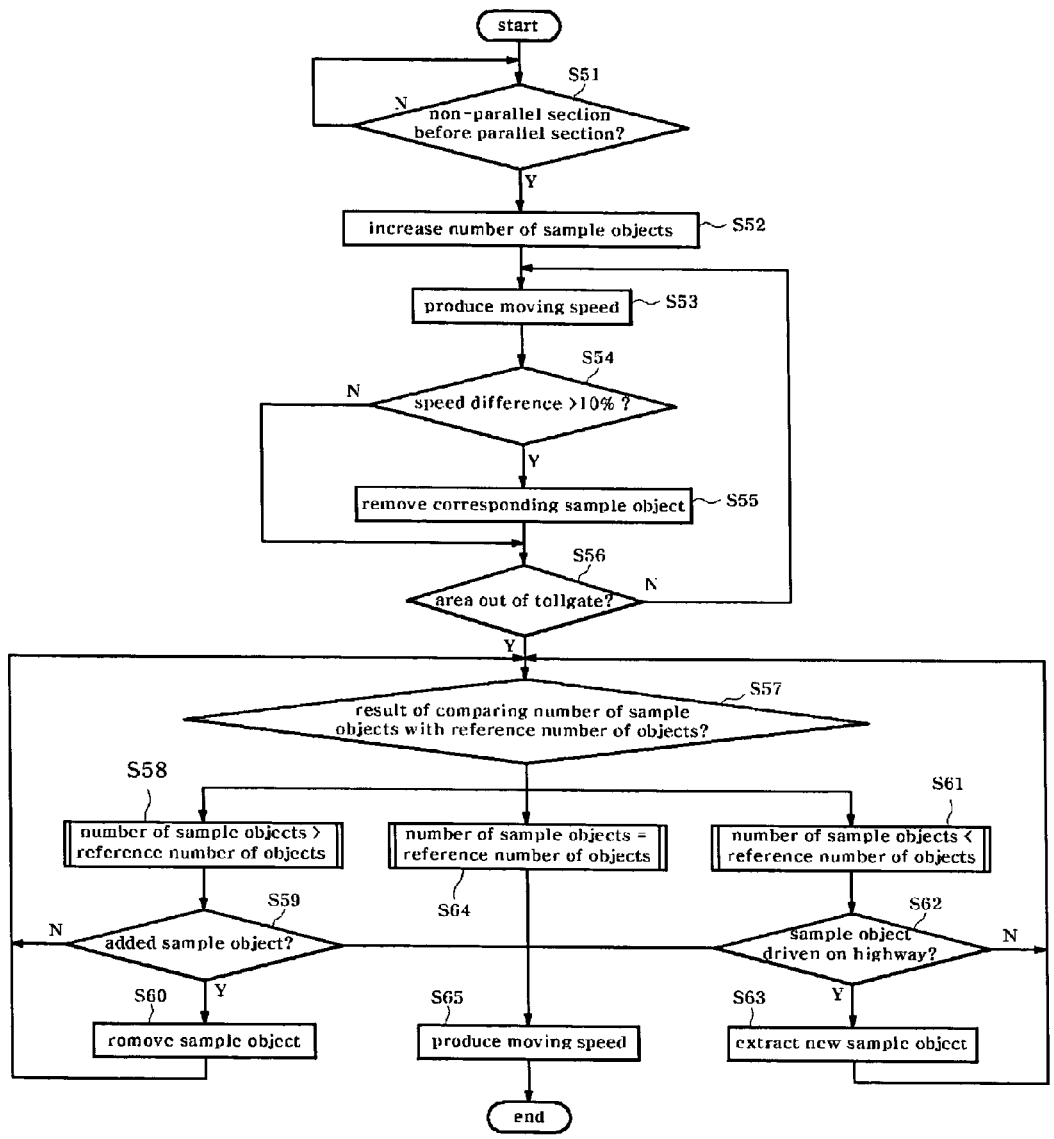

METHOD FOR OBTAINING TRAFFIC INFORMATION USING BILLING INFORMATION OF MOBILE TERMINAL

TECHNICAL FIELD

The present invention relates to a method for obtaining traffic information using billing information of a mobile terminal, and more particularly to a method for obtaining traffic information using billing information of a mobile terminal that can prevent crosstalk between a vehicle on a highway and a vehicle on a local road parallel to the highway and obtain correct traffic information associated with the highway, when obtaining accurate information on the road traffic state in real time by obtaining a unique number of the mobile terminal from the billing information and tracking a moving time of a corresponding mobile terminal between base stations where the mobile terminal attempts a telephone call on the highway.

BACKGROUND ART

A car navigation system is a high-technology system for receiving position information by identifying a current position of a vehicle and providing various services for providing a route guide, traffic guide, peripheral information, and additional information by combining the position information with geographic information. Furthermore, there has already been commercialized a car navigation system combined with global positioning system (GPS) technologies for vehicles capable of relaying driving directions to a driver through a display screen or voice signal and a geographic information system (GIS). This car navigation system is being employed for smooth land and water transport operations as in public transportation systems including delivery trucks, and quick delivery services.

A GPS receiver is mounted in a mobile device such as a personal digital assistant (PDA) so that a map and current position information of the mobile device are displayed on a screen of the mobile device. The GPS technology for a mobile terminal is applied to provide various information units such as traffic, shopping and caf? information, etc. associated with the current position.

A device for telematics, the combination of telecommunication and information, is mounted in vehicles, and couples wireless communication technology, GPS technology, GIS technology and call center technology to the vehicles. Moreover, the telematics device provides real-time traffic and living information for drivers, a method for taking action against an emergency situation, remote vehicle diagnosis, car accident prevention, theft prevention, driving route glide, and is coupled to a vehicle on-board controller, an audio system, a display, etc., such that the telematics device is developing into a mobile office concept.

There is a problem in that the vehicles must install the high priced telematics device for supporting the wireless mobile communication, GPS and GIS, so that the above-described services can be provided.

Thus, when the real-time traffic and living information and driving route information are desired using mobile phones carried by most of the drivers, the GPS receiver must be mounted on a hands-free set, and hence the drivers can receive various information units by accessing the Internet through the mobile phones after the GPS receiver identifies the positions of their vehicles.

FIG. 1 is a block diagram illustrating the configuration of a navigation system using a conventional mobile phone.

As shown in FIG. 1, the navigation system includes a mobile phone 40 for performing wireless communication through a wireless communication network 50; a service center 60 coupled to the wireless communication network 50 for analyzing real-time traffic information and calculating an optimum route; a GPS receiver 10 for identifying current position information from a satellite; a direction sensor 22; and an acceleration sensor 24. Moreover, the navigation system includes a navigator 20 for storing the position information received from the GPS receiver 10, accessing the service center 60 through the mobile phone 40, controlling a transmission operation for position information and a reception operation for various information units, and outputting the result through the mobile phone 40, and a mobile phone mount 30 on which the mobile phone 40 is mounted. The mobile phone mount 30 supplies power to the mobile phone 40.

In this case, the GPS receiver 10, the navigator 20 and the mobile phone mount 30 are mounted in a vehicle in a hands-free form and are formed so that they can be separated from the mobile phone 40.

The operation of the navigation system using the conventional mobile phone will be described with reference to a flowchart illustrating a method for operating the navigation system using the conventional mobile phone shown in FIG. 2.

First, the navigation system downloads an operating program from the service center 60 through the wireless communication network 50 using the mobile phone 40, identifies current position information through the GPS receiver 10, and registers the identified position information in the service center 60 (S10).

Then, the navigation system enables a driver to input information on a destination (S12). If so, the service center 60 produces traffic information analyzed in real time and an optimum route according to the current vehicle position and the destination (S14).

Then, the service center 60 transmits analyzed data to the mobile phone 40 (S16).

Then, the navigator 20 performs a road guide operation through the mobile phone 40 according to data transmitted through the mobile phone 40 and a vehicle traveling state based on the direction sensor 22 and the acceleration sensor 24 (S18).

In order that the traffic information and road guide service can be provided, the road traffic state must be identified and information of the identified road traffic state must be organized in a database of the service center 60. Traffic information services are being provided using information units acquired by a method for collecting traffic information through closed circuit televisions (CCTVs) installed on map roads by the Road & Transportation Builders Association and information providers, a method for collecting traffic information through traffic correspondents, a method for collecting traffic information through loop sensors installed on roads, a method for collecting traffic information using beacons, etc.

There is a problem in that high cost is required to operate vehicles for acquiring or collecting the traffic information or to purchase the traffic information from the information providers. Furthermore, there are another problems in that traffic information is not reflected in real time because it is difficult for the traffic information to be continuously measured and hence customer demand cannot be satisfied.

To address the above-described problems, the applicant filed applications entitled 'METHOD FOR OBTAINING TRAFFIC INFORMATION USING BILLING INFORMATION OF MOBILE TERMINAL' having Ser. Nos. 10-2003-

0019644 (Mar. 28, 2003) and 10-2003-0037190 (Jun. 10, 2003) with the Korean Intellectual Property Office.

When a mobile terminal attempts a telephone call on a highway (S31) as shown in FIG. 3, a system receives billing information necessary for performing a billing operation (S32), obtains an identification number of a mobile terminal from the received billing information (S33), receives a position registration request from a corresponding mobile terminal (S34), tracks a moving time between base stations according to registered position information (S35), and obtains information of a highway traffic state in real time by producing an average speed on a section-by-section basis (S36 and S37).

However, because at least one base station is shared between a local road and a highway in a section containing the local road and the highway parallel to the local road, the system cannot determine that a vehicle is driven on the local road where the vehicle is driven on the local road parallel to the highway after coming out of a highway tollgate. In this case, the system determines that the vehicle is still being driven on the highway. Thus, because the system produces information on a moving speed of the vehicle on the highway through a moving speed of the vehicle driven on the local road, it is difficult for the system to obtain information of a traffic state of the highway due to crosstalk between the highway and the local road.

DISCLOSURE

Therefore, the present invention has been made in view of the above problems, and it is an object of the present invention to provide a method for obtaining traffic information using billing information of a mobile terminal that can prevent crosstalk between a vehicle on a highway and a vehicle on a local road parallel to the highway and obtain correct traffic information associated with the highway, when obtaining information indicative of a road traffic state in real time by obtaining a unique number of the mobile terminal from the billing information and tracking a moving time of a corresponding mobile terminal between base stations where the mobile terminal attempts a telephone call on the highway.

In accordance with an aspect of the present invention, the above and other objects can be accomplished by the provision of a method for obtaining traffic information of a highway using billing information of a mobile terminal by extracting unique information of the terminal from call data when the terminal entering the highway attempts a telephone call, tracking a moving path and time between base stations and producing an average speed per hour, the method comprising the steps of: (a) when sample objects enters a section, parallel to a local road, containing a base station providing a communication service to an area of a tollgate, increasing the number of sample objects to a predetermined multiple of the reference number of objects; (b) tracking moving paths and moving time periods of the sample objects extracted at the step (a) between the base stations and producing an average speed per hour between the base stations; (c) when the difference in speed in an area of the base station providing the communication service to the area of the tollgate is reduced by a predetermined speed or more, removing a corresponding sample object; and (d) maintaining the number of sample objects as the reference number of objects, in an area of a base station out of the area of the tollgate in the section parallel to the local road.

Preferably, the predetermined multiple at step (a) is two.

Preferably, at least one new sample object before the section parallel to the local road is extracted and the number of sample objects is increased at step (a).

Preferably, the speed difference reduced by the predetermined speed or more at step (c) is 10%.

Preferably, the corresponding sample object is removed from the number of sample objects increased to the predetermined multiple if the number of sample objects is larger than the reference number of objects when the number of sample objects is maintained as the reference number of objects at the step (d).

Preferably, the removed sample object is listed, and is first extracted when the number of sample objects is insufficient.

Preferably, at least one sample object is extracted from objects continuously driven on the highway if the number of sample objects is smaller than the reference number of objects when the number of sample objects is maintained as the reference number of objects at step (d).

Preferably, the objects continuously driven on the highway are extracted from objects with which a setup operation in a different base station installed on the local road before the section parallel to the local road is not carried out the predetermined number of times.

In accordance with the present invention, when a terminal attempts a telephone call on a highway, call data necessary for performing a billing operation is extracted from information of the terminal and then position information is sent at predetermined time intervals according to the information of the terminal, such that a moving speed of a car is produced and hence the traffic state of the highway can be identified in real time. In order that traffic information crosstalk due to movement of an object between the highway and the local road through a tollgate can be prevented when the moving speed of an object is produced in a section parallel to a local road containing a tollgate, the number of sample objects is increased, a reduced speed difference of a sample object entering the local road is analyzed, and the sample object driven on the local road is removed, such that the traffic state of the highway can be identified normally.

DESCRIPTION OF DRAWINGS

The above and other objects, features and other advantages of the present invention will be more clearly understood from the following detailed description taken in conjunction with the accompanying drawings, in which:

FIG. 1 is a block diagram illustrating the configuration of a navigation system using a conventional mobile phone;

FIG. 2 is a flowchart illustrating a method for operating the navigation system using the conventional mobile phone;

FIG. 3 is a flowchart illustrating a conventional method for obtaining traffic information using billing information of a mobile terminal;

FIG. 4 is an explanatory view illustrating a section of parallel roads to which a method for obtaining traffic information using billing information of a mobile terminal is applied in accordance with the present invention; and FIG. 5 is a flowchart illustrating the method for obtaining traffic information using billing information of a mobile terminal in accordance with the present invention.

BEST MODE

Now, preferred embodiments of the present invention will be described in detail with reference to the annexed drawings. The preferred embodiments are not intended to limit the scope of the present invention. In the drawings, the same or similar elements are denoted by the same reference numerals even though they are depicted in different drawings.

FIG. 4 is an explanatory view illustrating a section of parallel roads to which a method for obtaining traffic information using billing information of a mobile terminal is applied in accordance with the present invention.

As shown in FIG. 4, first to fourth base stations 141 to 144 are installed to provide a communication service around a highway 100, while a fifth base station 145 is installed to provide a communication service around a local road 110. In a section 120 in which the highway 100 and the local road 110 are parallel to each other, the second to fourth base stations 142 and 144 are calmly used. In a non-parallel section, the fifth base station 145 provides the communication service to an area of the local road 110, and the first base station 141 provides the communication service to an area of the highway 100.

Moreover, the third base station 143 provides the communication service to an area of a tollgate 130 of the highway 100.

The method in accordance with the present invention is applied to the case where a determination cannot be made as to whether a sample object is driven on the local road 110 or the highway 100 because the communication service is provided to both areas of the local road 110 and the highway 100 by the second to fourth base stations 142 to 144 in the section 120 in which the local road 110 and the highway 100 are parallel to each other. In addition, where the sample object enters/exits the local road 110 or the highway 100 through the tollgate 130 positioned in the section 120, a determination can be appropriately made as to whether the sample object monitored on the highway 100 has entered the local road 110 through the tollgate 130 in accordance with the method of the present invention.

Now, a method for producing a moving speed in the section 120 in which the local road 110 is parallel to the highway 100, containing the third base station 143 providing the communication service to an area of the tollgate 130, will be described with reference to a flowchart illustrating the method for obtaining traffic information using billing information of a mobile terminal shown in FIG. 5.

First, where objects can enter/exit the tollgate 130, the number of sample objects, that is, mobile terminals 160 driven on the highway 100, is increased double the reference number of objects in a non-parallel section before a parallel section in which the highway 100 and the local road 110 are parallel to each other, and the increased number of sample objects is extracted (S51 and S52).

It is determined whether or not a setup operation between a terminal of the object and a different base station out of the highway 100 is carried out twice or more where a sample object exits the tollgate 130 as in the conventional method, a tracking operation is terminated according to a result of the determination, and a new sample object is extracted. However, because a base station providing the communication service to an area of the highway 100 is the same as that providing the communication service to an area of the local road 110 although the sample object exits the tollgate 130 in the section 120 in which the highway 100 and the local road 110 are parallel to each other and is driven along the local road 110, a determination cannot be appropriately made as to whether or not a sample object is driven on the local road 110 or the highway 100. Even though a sample object enters the local road 110 before the section 120, the number of sample objects is maintained and sample objects driven on the highway 100 are extracted so that traffic information can be collected normally.

Moving path and moving time periods of the increased number of sample objects between the base stations are tracked and hence an average speed per hour between the base stations is produced (S53).

Assuming that a moving speed of a sample object will be reduced when the sample object enters the local road 110 from the highway 100, on the basis of the produced average speed, it is determined that the corresponding sample object has entered the local road 110 if the speed difference between a corresponding sample object and other sample objects is 10% or more, and the corresponding sample object is removed and a tracking operation for the corresponding sample object is terminated (S54 and S55).

However, if the speed difference is below 10%, the corresponding sample object does not need to be discriminated from other sample objects even though the corresponding sample object is driven on the local road 110, and the corresponding sample object is ignored. It is thus determined that most of the sample objects are driven on the highway 100.

Because a change of a sample object entering/exiting the tollgate 130 is not considered in case of an area out of the tollgate 130 (S56), the traffic information is obtained by means of the conventional method and the increased number of sample objects is maintained as the reference number of objects (S57).

That is, where the number of sample objects, increased before entering the section 120, containing the removed sample object entering the local road 110 while exiting the tollgate 130 is larger than the reference number of objects, the increased number of sample objects is first removed, and the number of sample objects is maintained as the reference number of objects (S58, S59 and S60).

At this point, when the removed sample object is listed and the number of sample objects is insufficient in a subsequent section, the compulsorily removed sample object is first extracted, such that traffic information can be immediately obtained through previously identified information such as a driving direction, etc.

Where many sample objects enter the local road 110 through the tollgate 130 and hence the number of sample objects is below the reference number of objects, at least one new sample object is extracted (S61).

Because the local road 110 and the highway 100 are parallel to each other, the new sample object is extracted from sample objects other than a sample object associated with a setup operation in the fifth base station 145 providing the communication service to an area of the local road 110 before the section 120 so that only sample objects continuously driven on the highway 100 can be extracted (S62 and S63).

That is, because a base station of the local road 110 is separated from that of the highway 100 before the section 120, it can be determined that a sample object associated with the setup operation in the fifth base station 145 is continuously driven on the local road 110. Moreover, because a sample object is extracted from sample objects not associated with the setup operation in the fifth base station 145, it can be determined that the extracted sample object has been driven before the section 120.

Only the fifth base station 145 has been described in this embodiment, but at least three base stations continuously arranged to provide the communication service to an area of the local road 110 can be set up.

As described above, when the number of sample objects is maintained as the reference number of objects, it is determined that all extracted sample objects are driven on the highway 100 if no sample object enters/exits the tollgate between the highway 100 and the local road 110 in the section 120 in which they are parallel to each other, and the traffic information is obtained by means of the conventional method (S64 and S65).

INDUSTRIAL APPLICABILITY

As apparent from the above description, the present invention obtains a number of a mobile terminal from billing information necessary for performing a billing operation when a telephone call is made using the mobile terminal on a highway and tracks a moving time of the mobile terminal between base stations, such that information of a traffic state of the highway can be obtained in real time.

Furthermore, the present invention employs the existing mobile communication network to obtain traffic information, such that cost required for operating special vehicles for collecting traffic information and for obtaining traffic information from information providers can be reduced. In addition, the present invention can meet customer demand by continuously performing a measurement operation and reflecting the traffic information abruptly changed in real time.

The invention claimed is:

1. A method for obtaining traffic information of a highway using billing information of a mobile terminal by extracting unique information of the terminal from call data when the terminal entering the highway attempts a telephone call, tracking a moving path and time between base stations and producing an average speed per hour, the method comprising the steps of:
   (a) when sample objects enters a section, parallel to a local road, containing a base station providing a communication service to an area of a tollgate, increasing the number of sample objects to a predetermined multiple of the reference number of objects;
   (b) tracking moving paths and moving time periods of the sample objects extracted at the step (a) between the base stations and producing an average speed per hour between the base stations;
   (c) when a speed difference in an area of the base station providing the communication service to the area of the tollgate is reduced by a predetermined speed or more, removing a corresponding sample object; and
   (d) maintaining the number of sample objects as the reference number of objects, in an area of a base station out of the area of the tollgate in the section parallel to the local road.

2. The method as set forth in claim 1, wherein the predetermined multiple at the step (a) is two.

3. The method as set forth in claim 1, wherein at least one new sample object before the section parallel to the local road is extracted and the number of sample objects is increased at the step (a).

4. The method as set forth in claim 1, wherein the speed difference reduced by a predetermined speed or more at the step (c) is 10%.

5. The method as set forth in claim 1, wherein the corresponding sample object is removed from the number of sample objects increased to the predetermined multiple if the number of sample objects is larger than the reference number of objects when the number of sample objects is maintained as the reference number of objects at the step (d).

6. The method as set forth in claim 5, wherein the removed sample object is listed, and is first extracted when the number of sample objects is insufficient.

7. The method as set forth in claim 1, wherein at least one sample object is extracted from objects driven on the highway if the number of sample objects is smaller than the reference number of objects when the number of sample objects is maintained as the reference number of objects at the step (d).

8. The method as set forth in claim 7, wherein the objects driven on the highway are extracted from objects with which a setup operation in a different base station installed on the local road before the section parallel to the local road is not carried out the predetermined number of times.

* * * * *